Sept. 23, 1952  D. D. GRIFFIN  2,611,252
GRAPEFRUIT DISH
Filed Dec. 31, 1948
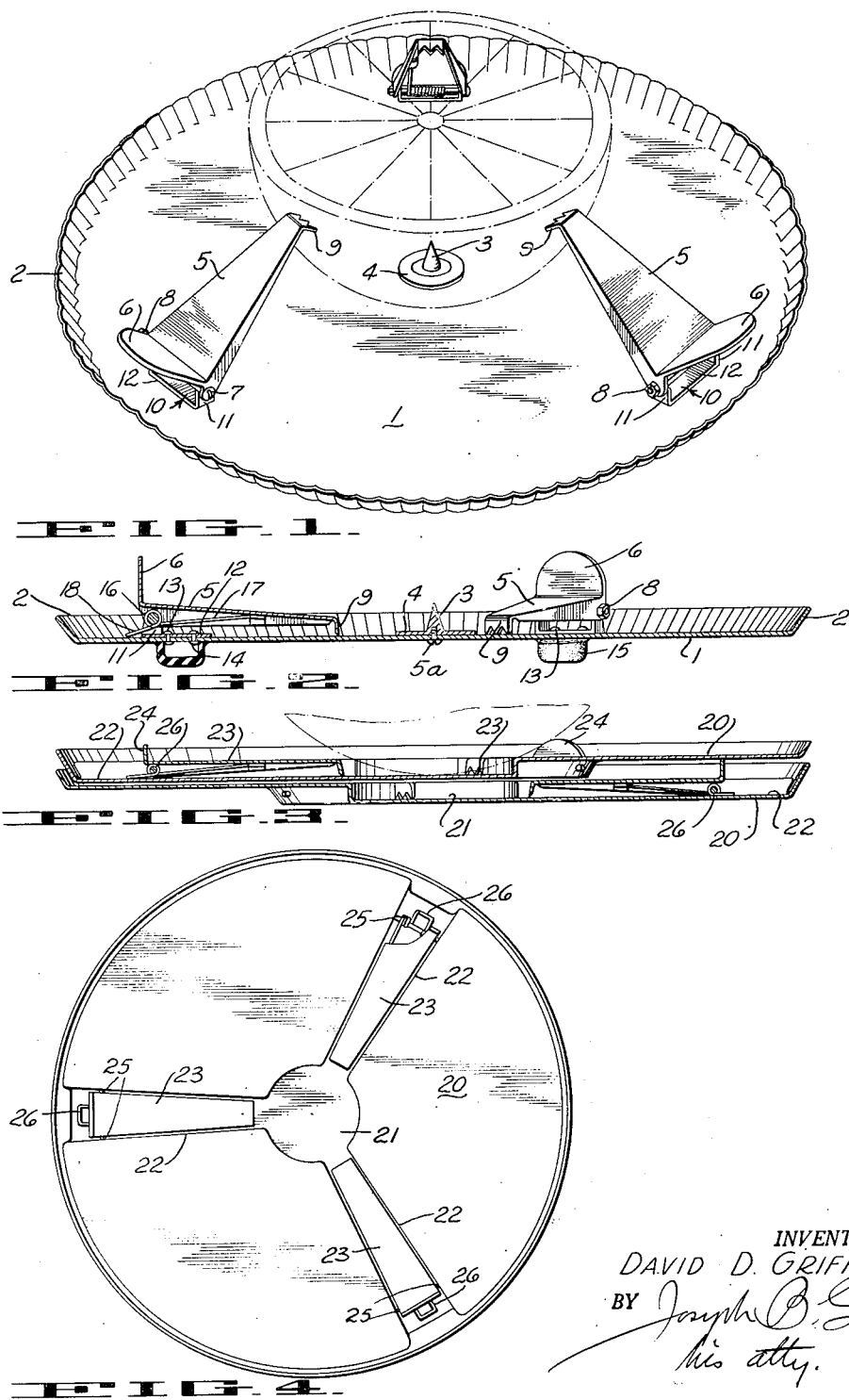
INVENTOR.
DAVID D. GRIFFIN
BY
his atty.

Patented Sept. 23, 1952

2,611,252

UNITED STATES PATENT OFFICE 2,611,252

GRAPEFRUIT DISH

David D. Griffin, Richmond, Calif.

Application December 31, 1948, Serial No. 68,481

2 Claims. (Cl. 65—15)

This invention relates to table accessories and particularly to those which are used for complementing table covers in simplifying in an effective and yet elegant manner the eating of certain natural foods which from their attachment with surrounding non-edible portions are difficult of separation. Fruits such as oranges and grapefruit and many of the varieties of smaller melons present a difficult problem when served as halves upon a small plate or within a bowl of the cereal type. While important advances have been made in kitchen appliances which separate the juices and even the flesh portions intact of oranges and grapefruit from the pulp and outer skin, no entirely satisfactory solution to the difficulties posed by the presentation of a freshly-sectioned, semi-spherical grapefruit upon the breakfast table is known. As is the common experience of almost everyone, it is necessary to hold the grapefruit with one hand while manipulating the spoon with the other. The unsatisfactory and frequently frustrating sequence which follows is too well known to require repetition here. Suffice it to mention the overall results, however, which invariably include a thorough acidulous wetting of the fingers, deposit of much of the juice in the receptacle provided and on the table linen, and a well nigh universal moral certainty that the larger portion of the juice and much of the flesh somehow become lost "en route." It is to the alleviation and practical elimination of the foregoing difficulties that the present invention is directed.

The principal object of this invention, therefore, is to provide an efficient and attractive table utensil for immobilizing a half-section of grapefruit or the like in its customarily presented position.

A further object of the invention is to provide a table utensil of the character described which is effective to clamp the grapefruit, for example, about a fixed reference point passing through the central axis of the fruit.

Another object of the invention is to provide a table utensil which maintains the grapefruit in its proper position despite the variety of spoon manipulations which may be resorted to in removing the edible portions therefrom.

Another object of the invention is to provide a table utensil which exerts on the comestible held thereby a clamping action having an inward and also a downward component to more securely hold the same in position.

A further object of the invention is to provide a clamp type utensil of the character described which is relatively flat when not in use and therefore may be readily stacked.

Another object of the invention is to provide a table utensil which is composed of readily accessible components and thus may be readily cleaned after use.

A still further object of the invention is to provide a utensil of the character described which is simple and inexpensive to construct and includes no exposed parts which are susceptible to injury in ordinary use.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Reference is now made to the drawing in which

Figure 1 is a perspective view of one form of the invention,

Figure 2 is a sectional view taken on a line 2—2 of Figure 1,

Figure 3 is a sectional view taken on a line 3—3 of Figure 4 of a modified form of the invention in which two utensils are in nested relation, and Figure 4 is a plan view of the form of the invention shown in Figure 3.

Reference is made to the drawing and particularly to Figures 1 and 2 thereof for an understanding of the salient features of one form of my invention. In such figures there is depicted a supporting plate 1 which is preferably circular in shape and includes a peripheral portion 2 extending outwardly at an acute angle to such plate. The peripheral portion is preferably provided with transverse flutings or similar indentations to stiffen the same and to improve the appearance of the utensil. The diameter of plate 1 is approximately twice the diameter of the average grapefruit, for example, such dimension being adequate for grapefruit of larger or smaller diameter, however, as will later appear.

Constituting a fixed reference point for the central axis of the grapefruit and adapted to extend upwardly into the outer skin thereof, is a conical pin 3 which is preferably provided with an integral base portion 4 of substantial diameter. Pin 3 is secured to the plate 1 in any desired manner such as by means of the screw 5a projecting upwardly from the lower surface of the plate in a manner which is clearly apparent from Figure 1. The junction of the lower surface of the pin 3 with the base portion 4 is formed as a smooth curve to which the outer skin of the impaled grapefruit is readily conformed in snug engagement. Also the base portion 4 is of slight vertical extent so that there is intimate engagement with the skin of the grapefruit throughout and particularly at the peripheral juncture of such base 4 and the plate 1. It will be understood, therefore, and particularly in consideration of the diagrammatic representation of the grapefruit in Figure 1 that the circular surface of the latter which is in contact with the base 1 is normally radially beyond the periphery of base portion 4.

Inwardly from the periphery 2 of the plate 1 and spaced equal distances about the conical pin 3 are disposed three anchoring devices for the outer skin of the grapefruit as the latter approaches its maximum diameter. Such devices may take the form of spring pressed jaws 5 having bent up handle portions 6 and tapering marginal walls 6 which are apertured at their bases to accommodate a hinge pin 7 therein. The latter is shown as in the form of a screw secured in place by a nut 8 on its opposite end although it is apparent that a hinge pin of any desired type may be used.

The converging end portions 9 of jaws 5 are preferably bent downwardly and are suitably serrated to more firmly engage the skin of the grapefruit as shown. Thus disposed, jaw ends 9 make only a slight angle with the horizontal and their thrust is therefore largely inward but also downward to a certain extent. This is true regardless of the variation in the diameter of the particular grapefruit being held thereby. Since the major thrust is as stated and in opposition to the anchoring effect of the conical pin 3, the grapefruit will be firmly immobilized to resist radial, axial or tangential manipulation of the user's spoon.

For supporting hinge pin 7 above the upper surface of the plate 1 and thus making possible the pivotal movement of jaw 5 thereabout there is provided a mount which for simplicity may take the form of a U-shaped yoke 10 having a pair of spaced ears 11 suitably apertured for the reception of hinge pin 7. For ease of assembly and to provide increased strength the portion of yoke 10 disposed between ears 11 is centrally extended as shown at 12 and may be secured to the plate 1 by rivets 13 and 14 or other suitable fasteners. Cupped feet 15 which provide a satisfactory non-slip engagement with the table or cover thereon are of such radial extent as to cover completely the rivets 13 and 14 and thus provide a neat external appearance for the utensil as viewed from below. Feet 15 may be suitably anchored in place by the use of a suitable cement. They are made preferably of rubber and since they are disposed directly beneath the line of thrust of the jaws 5, distortion of the plate between the adjacent jaws is minimized. A suitable coil spring 16 encircling the hinge pin 7 and having one end portion 17 in contact with the under surface of jaw 5 and the other end portion 18 pressing against the yoke 10 serves to urge the jaw inwardly as will be readily apparent from the drawing.

It is desired to point out the functional importance of the tapering configuration of the jaws 5 from their relatively wide hinge portion at the hinge pin 7 to their narrowed end portion 9 which engages the skin of the grapefruit. With the construction described there is virtually no lateral freedom for the end portion 9 due to the wide hinge base provided and hence rotative components arising from the manipulation of the user's spoon have no effect in dislodging the engagement of such end portions from the fruit. Accordingly, considerable tolerances in the fitting of the hinge pin 7 such as are inevitable in mass production operations still do not materially affect the efficiency of the device.

Attention is now directed to the form of the invention shown in Figures 3 and 4 wherein a more compact and easily nested embodiment is disclosed. In Figure 3 in which one plate is illustrated in its nested position within an identical lower plate, such plate 20 is of circular shape as before but in addition is centrally depressed to form a well 21 which is relatively shallow and is bounded by a side wall portion which is shown as joining the plate 20 at a right angle. In addition to the centrally depressed well portion 21, three equally spaced troughs or depressions 22 extend radially outward from the well 21 for receiving spring pressed jaws 23 therein. Troughs 22 also are relatively wide for their depth and are narrowed inwardly to accommodate the tapering jaws 23 which have the same shape as the jaws 5 of the embodiment of the invention first described. Also the bent up handle portions 24 are similar to handle portions 6 of the Figures 1 and 2 embodiment as will readily be apparent. Hinge pin 25 which serves the same purpose as hinge pin 7 of the first described form of the invention passes through side walls of the trough 22 in which it is anchored as by suitable peening over of the end portions. Coil spring 26 is also similar to spring 16 first described and serves to urge the jaws 23 downwardly as shown in Figure 3.

Particular attention is called to the provision of well 21 and the circular juncture of its lateral wall with the inner margin of the plate 20. Such well and the circular juncture referred to serve the same purpose as the conical pin 3 of the form of the invention first described, namely that of centering the grapefruit in the plate and since the central portion of the outer skin of the fruit lies inwardly of the circular juncture referred to as shown by the dotted outline of the same in Figure 3, there will be an anchoring effect on the grapefruit as a whole when the spring pressed jaws are in position tending to resist torques resulting from manipulations of the user's spoon.

The form of the invention shown in Figures 3 and 4 is particularly suitable for use in railroad dining cars and aircraft where utmost compactness resulting from stacking or nesting of the superposed plates is desirable. At this point it might also be pointed out that this invention will add to the enjoyment of aircraft travel since grapefruit which is an excellent appetizer for airplane passengers who are susceptible to air sickness may now be served in its most appealing form and without the use of extra plates beneath the utensil described. Since the jaw members press the grapefruit inwardly from three directions, there is no localized squeezing of the skin by the fingers resulting in juice being extracted from the fruit at undesired areas thereof and consequent overflow of the same down the sides of the skin. Accordingly, elegant and efficient serving of grapefruit on aircraft even under unstable flight conditions may now become a reality since the plate holding the spring jaws may be held at an angle which is considerable with respect to a horizontal plane without difficulty.

I claim:

1. A table accessory for holding semi-spherical portions of grapefruit or the like comprising a relatively flat plate, the central portion of which is recessed to provide a circular rim for engaging the skin of said grapefruit and equally spaced radial portions of which are recessed to communicate with said central portion, and a plurality of spring pressed jaws pivotally mounted in said radial recesses and extending inwardly toward said central recess.

2. A table accessory for holding semi-spherical portions of grapefruit or the like comprising a relatively flat plate having an upwardly inclined marginal portion, and a centrally depressed portion providing a circular rim for engaging the skin of said grapefruit, said plate having also a plurality of equally spaced radial recesses tapering inwardly toward the center thereof, and a plurality of spring pressed jaws of similarly tapering configuration pivotally mounted in said radial recesses and disposable upwardly into engagement with said grapefruit or downwardly into a nested position within said recesses.

DAVID D. GRIFFIN.

REFERENCES CITED

The following references are of record in the file of this patent:

UNITED STATES PATENTS

| Number | Name | Date |
| --- | --- | --- |
| 53,849 | McGill | Apr. 10, 1866 |
| 521,612 | Hiller et al. | June 19, 1894 |
| 521,613 | Hiller | June 19, 1894 |
| 527,603 | Glahn | Oct. 16, 1894 |
| 1,234,877 | Coppedge | July 31, 1917 |
| 1,246,624 | Lundahl | Nov. 13, 1917 |
| 1,250,954 | Boyer | Dec. 25, 1917 |
| 1,595,356 | Moseman | Aug. 10, 1926 |
| 1,720,115 | Barnes | July 9, 1929 |
| 1,919,765 | Barnes | July 25, 1933 |
| 1,974,221 | Stonehouse | Sept. 18, 1934 |
| 2,110,542 | Allen | Mar. 8, 1938 |
| 2,124,477 | Thoeny | July 19, 1938 |
| 2,352,684 | Braddock | July 4, 1944 |

FOREIGN PATENTS

| Number | Country | Date |
| --- | --- | --- |
| 5,735 | Great Britain | Apr. 3, 1891 |
| 14,517 | Great Britain | Aug. 14, 1900 |